United States Patent
Goto et al.

[11] Patent Number: 5,828,014
[45] Date of Patent: Oct. 27, 1998

[54] ELEVATOR SPEED CONTROL CIRCUIT

[75] Inventors: Michio Goto, Yokohama; Kazuya Ogura; Yasuhiro Yoshida, both of Nagoya; Masayuki Mori, Inazawa, all of Japan

[73] Assignee: Otis Elevator Company, Farminton, Conn.

[21] Appl. No.: 872,483

[22] Filed: Jun. 7, 1997

[30] Foreign Application Priority Data

Jun. 7, 1996 [JP] Japan ................................. 8-145650
Nov. 7, 1996 [JP] Japan ................................. 8-294685

[51] Int. Cl.⁶ .................................................. B66B 1/34
[52] U.S. Cl. ........................... 187/292; 187/293; 187/295
[58] Field of Search .................................. 187/289, 292, 187/295, 277, 293

[56] References Cited

U.S. PATENT DOCUMENTS

| | | | |
|---|---|---|---|
| 3,631,326 | 12/1971 | Virkala | 318/140 |
| 4,269,286 | 5/1981 | Ishii et al. | 187/29 |
| 4,271,931 | 6/1981 | Watanabe | 187/29 R |
| 4,616,733 | 10/1986 | Ishii | 187/29 R |
| 5,070,967 | 12/1991 | Katzy et al. | 187/116 |
| 5,542,501 | 8/1996 | Ikejima et al. | 187/292 |

FOREIGN PATENT DOCUMENTS

| | | |
|---|---|---|
| 1555520 | 11/1979 | United Kingdom . |
| 2266976 | 11/1993 | United Kingdom . |

*Primary Examiner*—Robert Nappi

[57] ABSTRACT

In an elevator speed control circuit that has a proportional and integral speed amp 3 responsive to the deviation between a speed command $\omega^*$ and actual motor speed $\omega_M$, there is provided a car motion feedback circuit that amplifies the difference between a speed command $\omega^*$ and actual car speed $\omega_{car}$ (or acceleration command and actual acceleration) with amp 12, extracts car vibration characteristics through band-pass filter 14, and changes these vibration components to the optimal phase in a phase correction filter 16 for feeding back. A load torque predictor 21 estimates load torque from signals from circuits 2–19 and from actual motor speed $\omega_M$ to improve speed feedback characteristics and the effectiveness of external disturbance suppression in elevator speed control. A variety of variable circuit elements are disclosed.

16 Claims, 17 Drawing Sheets

ELEVATOR SPEED CONTROL CIRCUIT

TECHNICAL FIELD

The present invention pertains to an elevator speed control that suppresses vibration in the speed control of a multi-inertial system such as a skyscraper elevator, wherein several inertial bodies are coupled by elastic systems and which has several resonance frequencies.

BACKGROUND ART

Several driving methods are available for elevators. A balanced type of elevator system using a counterweight is constructed as illustrated in FIG. 20. That is, both a car 106 and a counterweight 107 are installed on a hoist rope 105 which is applied onto a driving sheave 103 that is turned by a motor 102. The motor speed is detected by a pulse pickup PP1, and the speed of the car 106 is detected by a pulse pickup PP2 at a governor 111. A controller 101 controls the motor 102. In FIG. 20, the speed of the car is detected by PP2, changing the linear movement of the governor rope 112 which is moved by the car 106 using a pulley 113 into rotary motion. It can also be detected using other methods. As illustrated in FIG. 21, speed can be detected by installing a speed detecting disc 109 on the car 106, which is in contact with a guide rail 110 and is turned by the movement of the car. Also, an accelerometer may be installed on the car, and its integral values may be used.

With a low-rise elevator, no vibration occurs in the hoist rope, and the entire elevator may be considered to be a single inertia. Thus, the sum of the inertia for the entire elevator could be converted through the motor shaft to design the speed control system. Also, because there is no vibration, the control of speed could be accomplished by a simple speed loop, such as a current control. However, with a balanced type of elevator used for a skyscraper, the vibration of the rope cannot be ignored. The effects of the counterweight will also be a cause of system disturbance. Thus, uncomfortable vibration is generated on the car.

The elevator system of FIG. 20 is modeled to be a penta-inertial system. Here, however, it is approximated to be a tri-inertial system for the sake of simplicity. The model is illustrated in FIG. 22. The motor and the car, and the motor and the counterweight are coupled by the hoist rope which comprises an elastic system. A characteristic of this model is that inertia exists on both ends of the model, and when the speed or the position of the car are to be controlled using the model, the vibration also occurs on the side of the counterweight, which will be a disturbance to the car speed control.

In the model illustrated in FIG. 22, the spring constant of the elastic system varies depending on the position of the car, and the following two types of vibration are generated:
1) In-phase mode, wherein the vibration occurs between (motor+car) and CWT, and
2) Out-of-phase mode, wherein the vibration occurs between (motor+CWT) and car.

When the car is at an upper end of the hoistway, the rope between the car and the motor will be nonvibrating, and thus the in-phase mode of 1), above, will be the main vibration. When the car is at a lower end of the hoistway, the rope between the counterweight and the motor will be nonvibrating, and thus the out-of-phase mode of 2), above, will be the main vibration.

Various methods have been proposed to eliminate this vibration. As signals for vibration suppression, car speed and car acceleration are considered. Usually, the speed of the car is measured by one of the following two methods: to measure it in a machine room located at an upper part of the building using a metallic tape, governor rope, etc.; or to measure it near the car using a touch roller, etc. However, problems arise if the building is very tall. In the first method, the effect of the tape or the rope between the car and the machine room cannot be ignored. Vibration or propagation delay will occur. In the latter method, a problem of slipping will occur because the elevator speed will be high.

On the other hand, the aforementioned problems will not occur if car acceleration derived from an acceleration detector installed on the car is used; and thus the condition of the car can be measured irrespective of the installation condition of the elevator. However, if a direct feedback of the car acceleration is used, a large enough feedback gain may not be obtained because of the detection noise, the vibration noise between the car and the guide rail, etc. Also, in terms of the frequency characteristics of an acceleration detector, the detection accuracy at low frequencies is low. Thus, there is also a problem of drift.

DISCLOSURE OF INVENTION

Objects of the invention include speed control for a multi-inertia system such as an elevator, wherein several inertial bodies are connected to the motor with an elastic system and which has several resonance frequencies, which can control the speed without vibrating the multi-inertia system.

According to the invention, an elevator speed control has a proportional and integral (PI) speed amplifier (amp) that amplifies the deviation between the motor speed command and the actual motor speed, a car motion feedback circuit amplifies either the difference between the speed command and the actual car speed or the difference between the acceleration command and the actual car acceleration, a bandpass filter extracts the vibration components of the car from the motion feedback signal and a phase filter changes the vibration components to the optimum phase for feedback to the output of the speed amplifier.

In accordance with the invention, a load torque predictor estimates torque loading effects on the motor as a function of motor speed to correct the torque command of the motor.

In accordance further with the invention, the gain of the speed amp, alone, or together with the gain of the predictor amp, may be made variable as a function of the motor speed.

Advantages of the present invention include:
the vibration of the car is actively suppressed in a speed control for a skyscraper elevator; with taller buildings and higher speeds, car vibration is suppressed using car acceleration information; control of elevator speed without overshoot by predicting load torque; because the system considers changes in torque characteristics depending on the position of the elevator, the vibration is adequately suppressed irrespective of elevator position; passenger comfort when the elevator is about to stop is improved by varying various gains during very slow speed operation; in-phase vibration is readily suppressed; disturbance elements caused by speed detection errors are suppressed; even if there is a delay in detecting car speed, vibration is suppressed.

Other objects, features and advantages of the present invention will become more apparent in the light of the following detailed description of exemplary embodiments thereof, as illustrated in the accompanying drawing.

BEST MODE FOR CARRYING OUT THE INVENTION

Control parameters are defined as follows:

| | |
|---|---|
| $\omega^*$: | speed command |
| $\omega_M$: | actual motor speed |
| $\omega_{car}$: | actual car speed |
| $\alpha^*$: | acceleration |
| $\alpha_{car}$: | actual car acceleration |
| $\tau_M$: | motor torque |
| $H_{car}$: | actual car height |
| $K_v$: | speed amp gain |
| Tml*: | elevator model time constant |
| K1: | load torque predictor amp gain |
| T1: | load torque predictor integral time constant |
| Kd: | car speed feedback amp gain |

Figure 1:
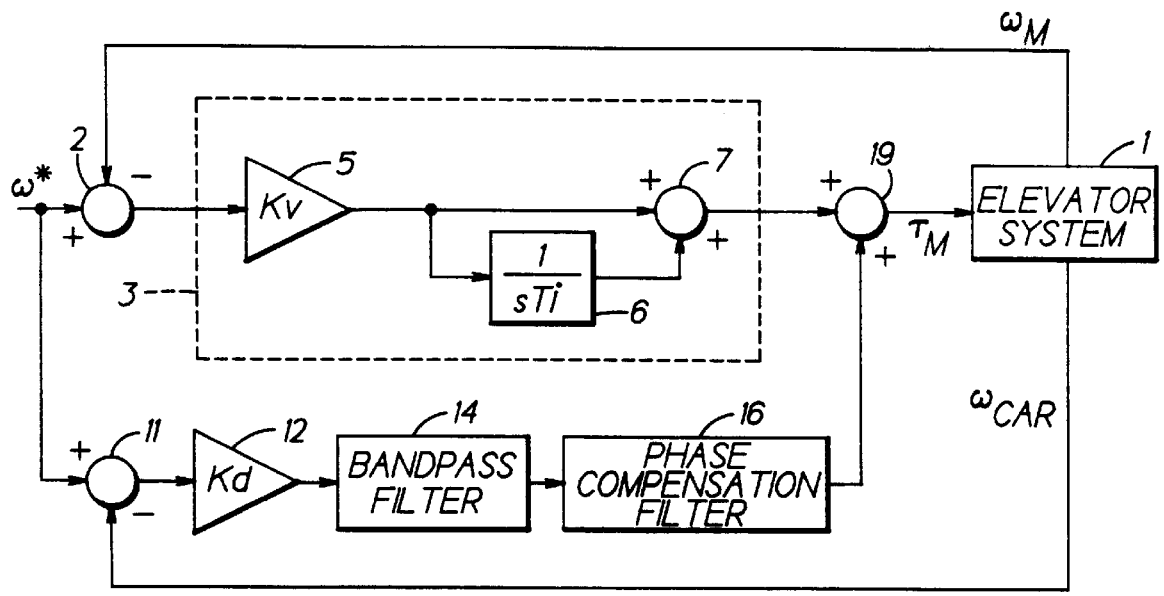
FIG. 1 is a block diagram of an elevator speed control circuit that uses car speed feedback.

FIG. 1 illustrates an elevator speed control circuit that uses a car speed feedback system. In the figure, 1, is an elevator system controlled by the torque command, $\tau_M$, 2, is a subtractor that provides the deviation between the speed command, $\omega^*$, and the actual motor speed, $\_\omega_M$, and 3 is a proportional and integral motion or speed amplifier (amp). The speed amp 3 is comprised of an amp 5, an integrator 6 and an adder 7 that adds the proportional components from the amp 5 and the integral values from the integrator 6 to provide a torque indicating signal to an adder 19.

Elements 11–14 indicate the car speed feedback system. Elements 10 and 12 form a deviation means in which 11 is a subtractor that provides the deviation between the speed command $\omega^*$ and the actual car speed value $\omega_{car}$; this removes the frequency components contained in the speed command from the actual car speed value, leaving the car vibration components at the output of the subtractor 11; and 12 is a speed amp that amplifies said deviation. 14 is a bandpass filter that extracts the resonance frequency components of the vibration of the rope from the car vibration components at the output of the amp 12. A feedback means includes a phase compensating filter 16 which may be a lead filter that adjusts the phase of the extracted resonance frequency components to an appropriate phase for feedback, and an adder 19 that adds the phase-adjusted, extracted vibration components to the torque indicating signal from the speed amp 3 to provide vibration-cancelling feedback. Said speed control circuit takes the difference between the speed command $\omega^*$ and the actual car speed value $\omega_{car}$, multiplies it by the gain $K_d$, extracts the components resulting from the vibration of the rope using a bandpass filter, and, using a phase compensating filter, provides feedback to the torque indicating output of the speed amp as a vibration suppression signal, to provide the torque command to the motor. Thus, the vibration of the car is actively suppressed in the elevator speed control.

Figure 2:
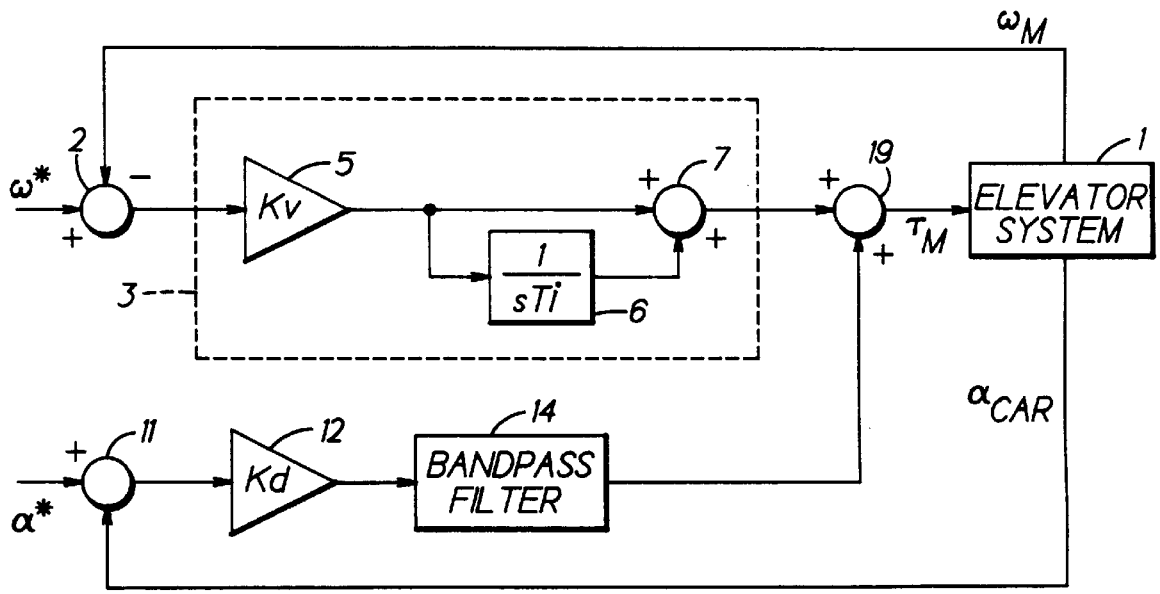
FIG. 2 is a block diagram of an elevator speed control circuit that uses car acceleration feedback.

FIG. 2 illustrates an elevator speed control circuit that uses a car acceleration (rather than speed) feedback system. In the figure, 1 is an elevator system, 2 is a subtractor that provides the deviation between the speed command $\omega^*$ and the actual motor speed value $\omega_M$, 3 is a proportional and integral motion or speed amp. The deviation means includes a subtractor 11 that provides the deviation between the acceleration command $\alpha^*$ and the actual car acceleration value $\alpha_{car}$, and an acceleration amp 12 that amplifies said deviation, 14 is a bandpass filter that extracts the resonance frequency components of vibration from the signal output of said amp, and feedback means comprises the adder 19 that adds said car vibration components as vibration-cancelling feedback to the torque indicating signal from the speed amp 3. Since said speed control circuit uses a car acceleration feedback responsive to the difference between the car acceleration command and the actual car acceleration value, the vibration can be suppressed more actively. The actual car acceleration can be obtained relatively stably even in a skyscraper elevator. Also, since the actual car acceleration signal has a phase that is 90° ahead of the actual speed information, no phase compensating filter is needed, and thus the number of adjustment parameters can be reduced.

The control circuit 2–19 is a car motion feedback system that does not consider all characteristics of disturbances, such as mechanical energy loss or load variations in the car. Thus, its disturbance characteristics are poor. Also, speed overshoot occurs in the PI control used for the speed control system, so it is not entirely suitable for an elevator system. However, with the circuit illustrated in FIG. 3, predicted load torque is applied as feedback to the car motion control system, so no overshoot will occur, the speed follow-up difference is suppressed, and the disturbance suppression effect is high.

Figure 3:
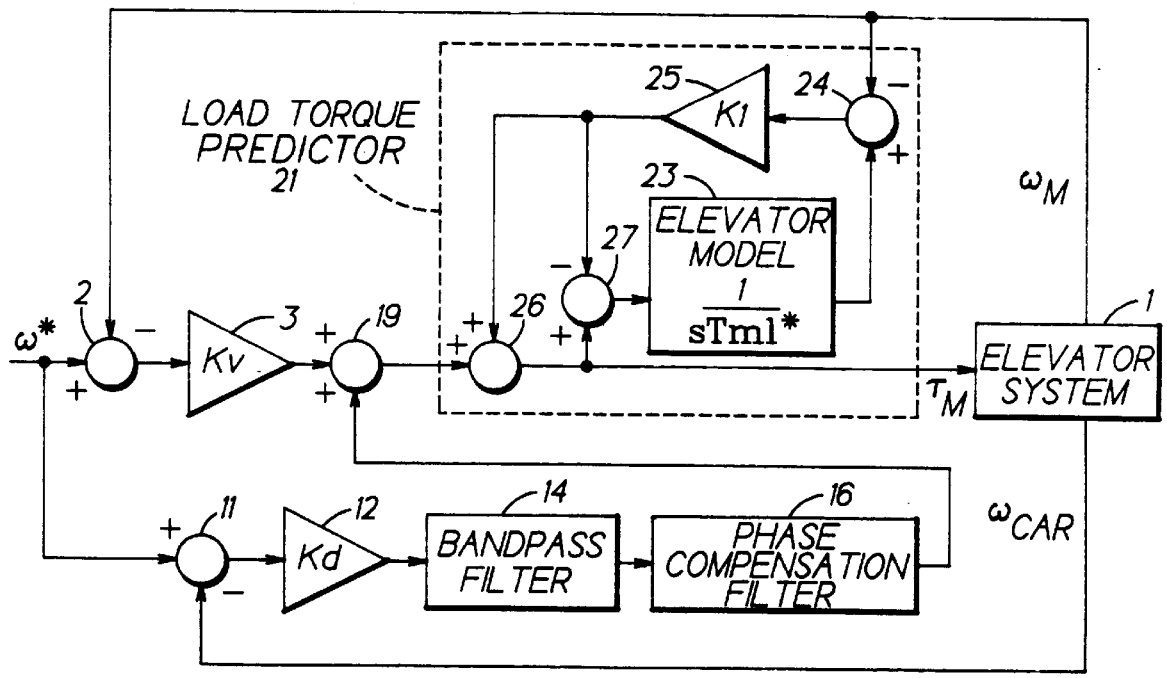
FIG. 3 is a block diagram of an elevator speed control circuit including simple load torque predictor.

FIG. 3 illustrates an elevator speed control circuit that uses a simple load torque predictor. In the figure, 1 is an elevator system, 2–19 indicate a control circuit with a car speed feedback system constructed in the same manner as the aforementioned FIG. 1, and 21 is a simple load torque observer that receives both the signal from this control circuit 2–19 and the actual motor speed value $\omega_M$, estimates the disturbance torque, and suppresses the disturbance with feedback. The load torque predictor 21 consists of an elevator model 23, an amp 25 and summers 24, 26 and 27. The disturbance torque estimate from the amp 25 is added to the signal from the control circuit 2–19 by the adder 26 to obtain the torque instruction $\tau_M$ of the elevator system 1. At the same time, the difference between this torque instruction and the disturbance torque estimate from the amp 25 is taken by the subtractor 27 and provided to the elevator model 23. The difference between the output signal from the elevator model and the actual motor speed detected value $\omega_M$ is taken by a subtractor 24, multiplied by the gain K1 by the amp 25, and added to the torque command from the adder 19 as the aforementioned disturbance torque estimate. Because the load torque predictor responds to the vibration components from the counterweight (FIG. 20) as a disturbance, it also prevents the vibration of the counterweight from being transmitted to the car through the motor. Therefore, it also has a suppression effect on the aforementioned in-phase mode vibration.

Figure 4:
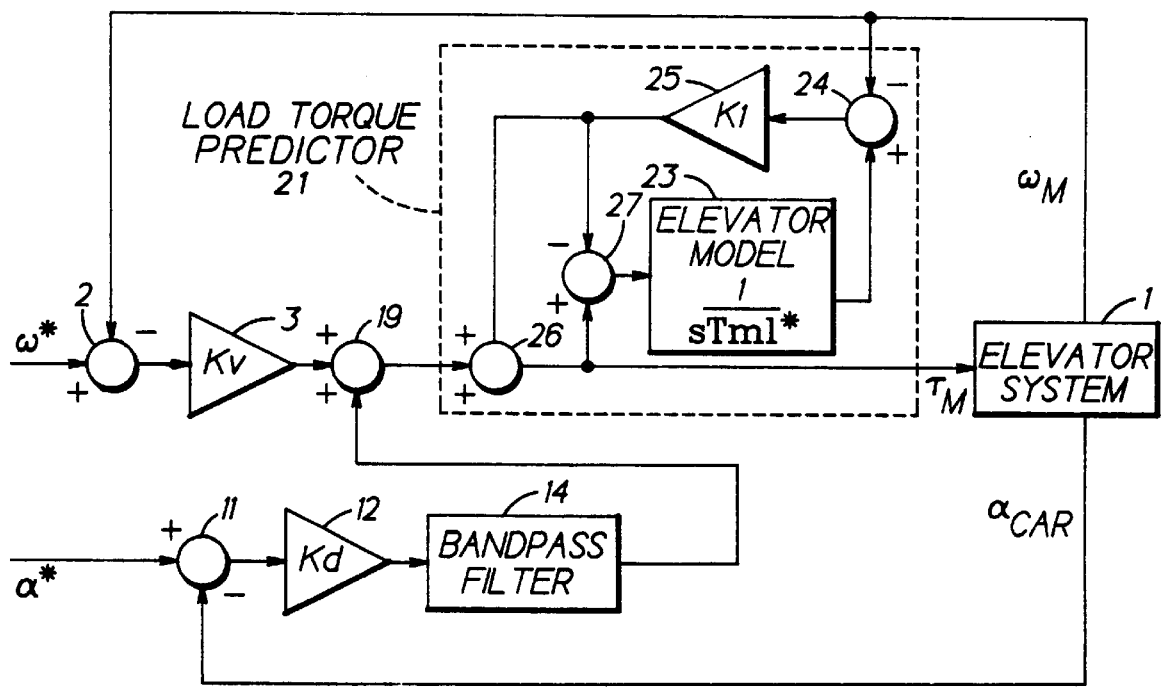
FIG. 4 is a block diagram of a speed control circuit similar to FIG. 3, using car acceleration feedback.

FIG. 4 illustrates another example of an elevator speed control circuit that uses a simple load torque predictor. In this speed control circuit, the car speed feedback system 11–16 of the speed control circuit 2–21 that uses a simple load torque predictor 21 in FIG. 3 is replaced with the acceleration feedback system 11–14 used in FIG. 2. Because this speed control circuit uses a car acceleration feedback system, the vibration of the car can be suppressed more actively than the example illustrated in FIG. 3.

In the circuits illustrated in FIGS. 3 and 4, the load torque predictor is a simple, minimum-dimension load torque observer. Thus, implementation in software will be easy.

Figure 5:
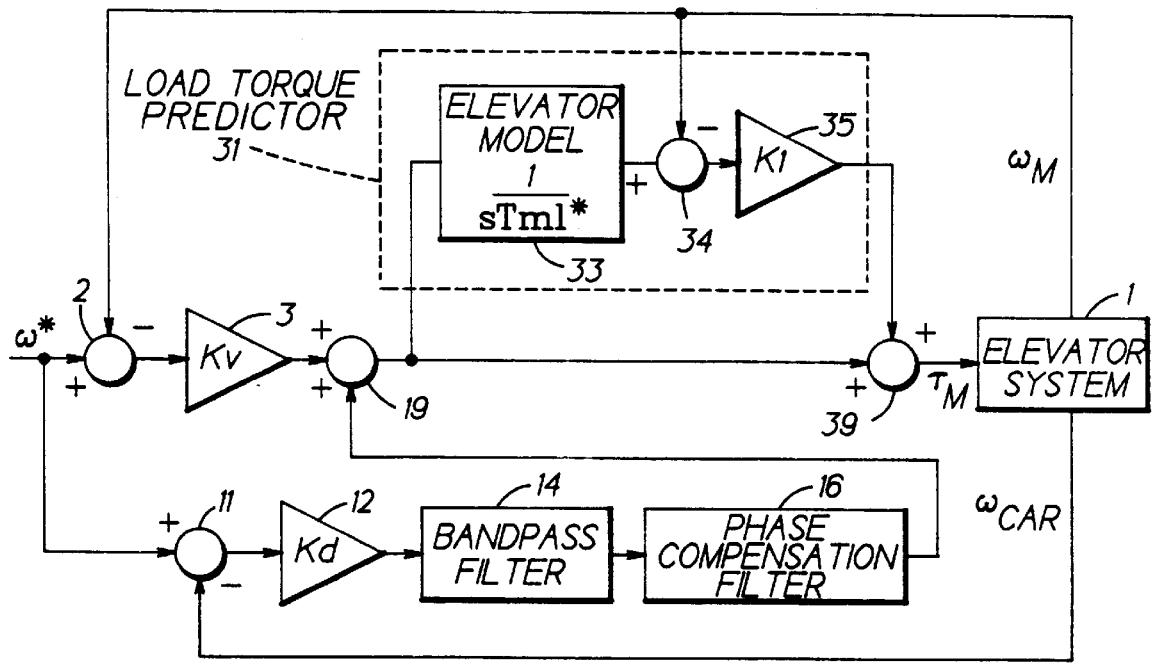
FIG. 5 is a block diagram of an elevator speed control circuit which uses a modified load torque predictor.

FIG. 5 illustrates an elevator speed control circuit that uses a modified load torque predictor. In the figure, 1 is an elevator system, 2–19 indicate a control circuit constructed in the same manner as the example in FIG. 1, 31 is a simple load torque predictor that is a modified minimum-dimension load torque predictor, and 39 is an adder that adds the signal from the predictor 31 to the torque command from the control circuit 2–19 and outputs it to the elevator system 1. The load torque predictor 31 is comprised of an elevator model 33 to which the signal from the control circuit 2–19 is input, a subtractor 34 that takes the difference between the signal from this model and the actual motor speed value $\omega_M$, and an amp 35 that multiplies the output from this adder with the gain K1 and outputs it to an adder 39. With this circuit, the signal output from the control circuit 2–19 is input to the elevator model, and the difference between the signal from said model and the motor speed detected value $\omega_M$ is taken. The disturbance torque is estimated, multiplied by the gain of the amp, and added to the signal from the control circuit 2–19. Thus, an elevator system control with a high disturbance suppression effect is realized.

Figure 6:
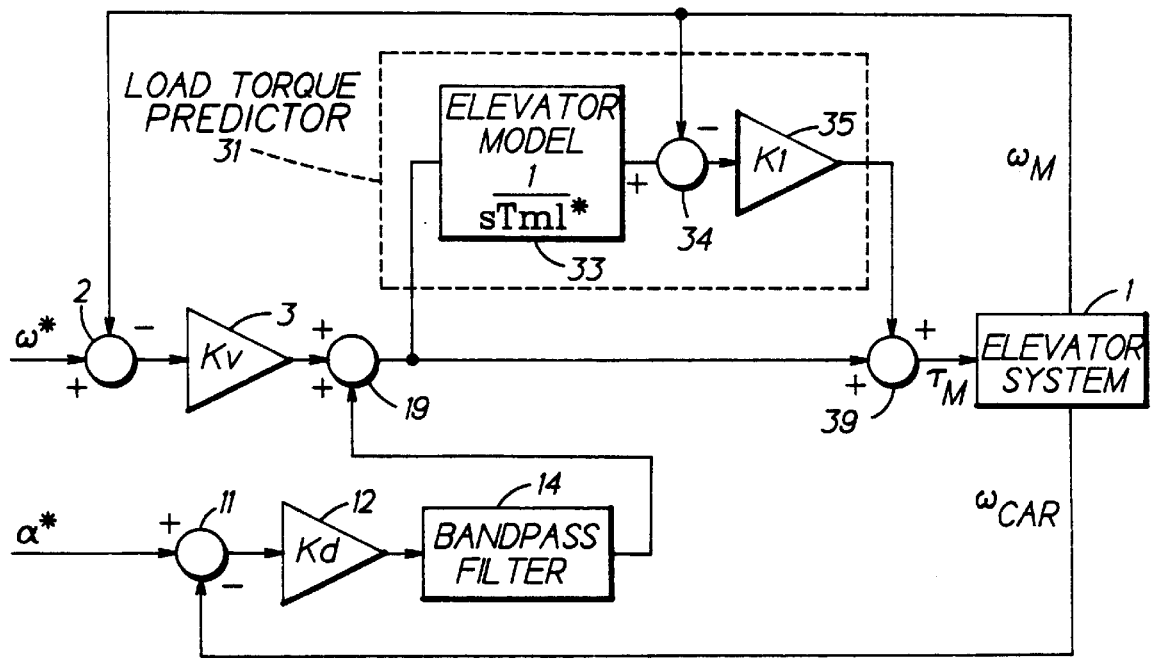
FIG. 6 is a block diagram of a speed control circuit similar to FIG. 5, using car acceleration feedback.

FIG. 6 illustrates another example of an elevator speed control circuit that uses a modified load torque predictor. In this speed control circuit, the car speed feedback system 11–16 of the speed control circuit 2–31 that uses a modified load torque predictor 31 illustrated in FIG. 5 is replaced with a car acceleration feedback system 11–14 used in FIG. 2. Because said speed control circuit uses a car acceleration feedback system, the vibration of the car can be suppressed more actively than the example illustrated in FIG. 5.

The load torque observer 31 in FIGS. 5 and 6 is more simplified than the minimum-dimension load torque observer in FIGS. 3 and 4. Thus, it can be implemented in software more easily.

Figure 7:
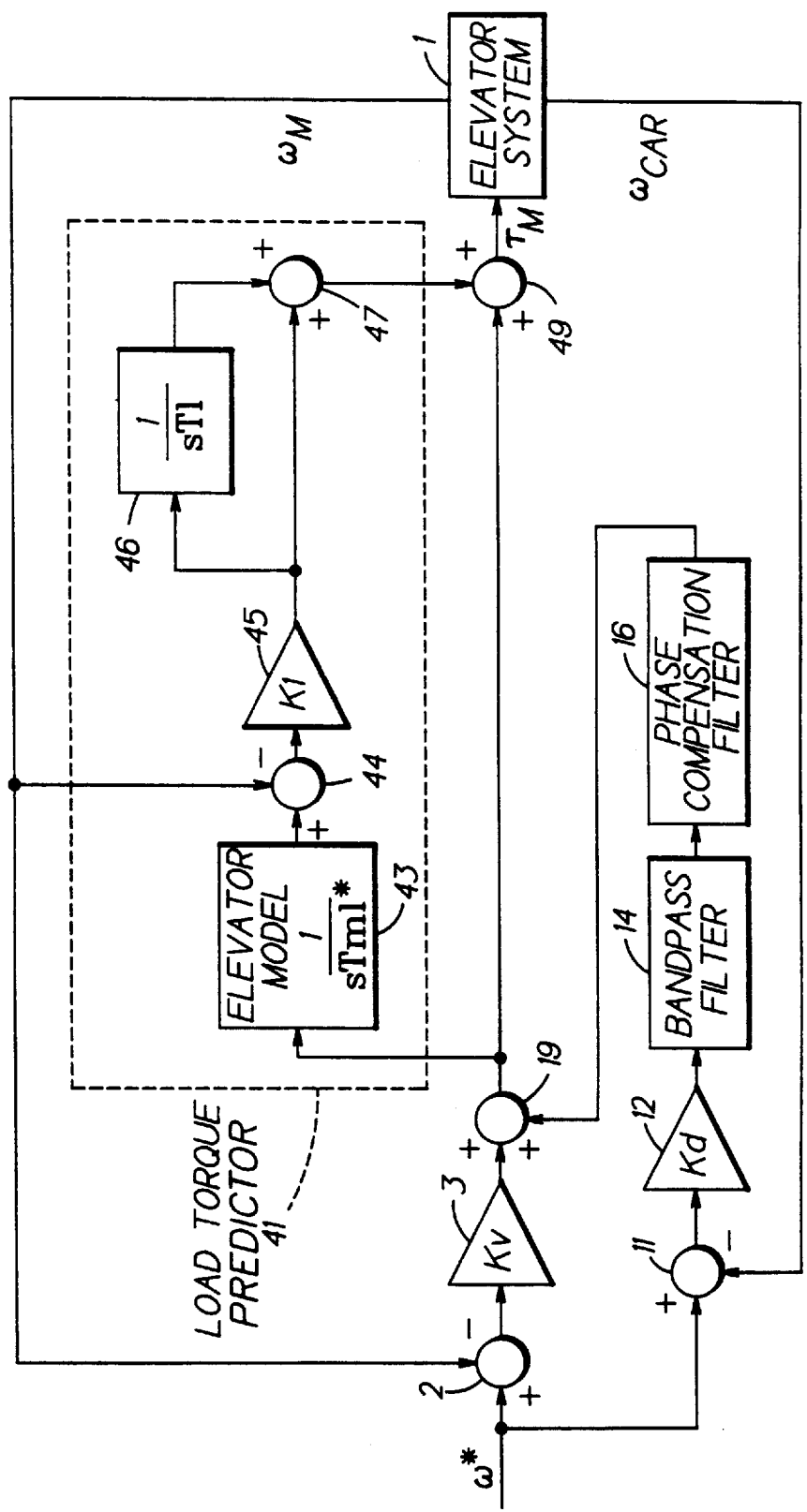
FIG. 7 is a block diagram of an elevator speed control circuit which uses a sophisticated load torque predictor.

FIG. 7 illustrates an elevator speed control circuit that uses a higher-dimension, more sophisticated load torque predictor. In the figure, 1 is an elevator system, 2–19 indicate a control circuit with a car speed feedback system that is constructed in the same manner as the example in FIG. 1, 41 is a load torque predictor, and 49 is an adder that adds the signal from the predictor 41 to the torque instruction from the control circuit 2–19 and outputs it to the elevator. The load torque observer 41 is comprised of an elevator model 43 to which the torque instruction from the control circuit 2–19 is input, a subtractor 44 that takes the difference between the signal from this model and the motor speed detected value $\omega_M$, an amp 45 that multiplies the signal from this adder by gain K1, an integral circuit 46 that integrates the output signal of this amp, and an adder 47 that adds the output signal of the amp 45 and the output signal of the integral circuit 46 and outputs it to the aforementioned adder 49. This predictor 41 can estimate more strict load torque than the circuit of FIG. 3, and the effect of suppressing vibration and disturbance is improved.

Figure 8:
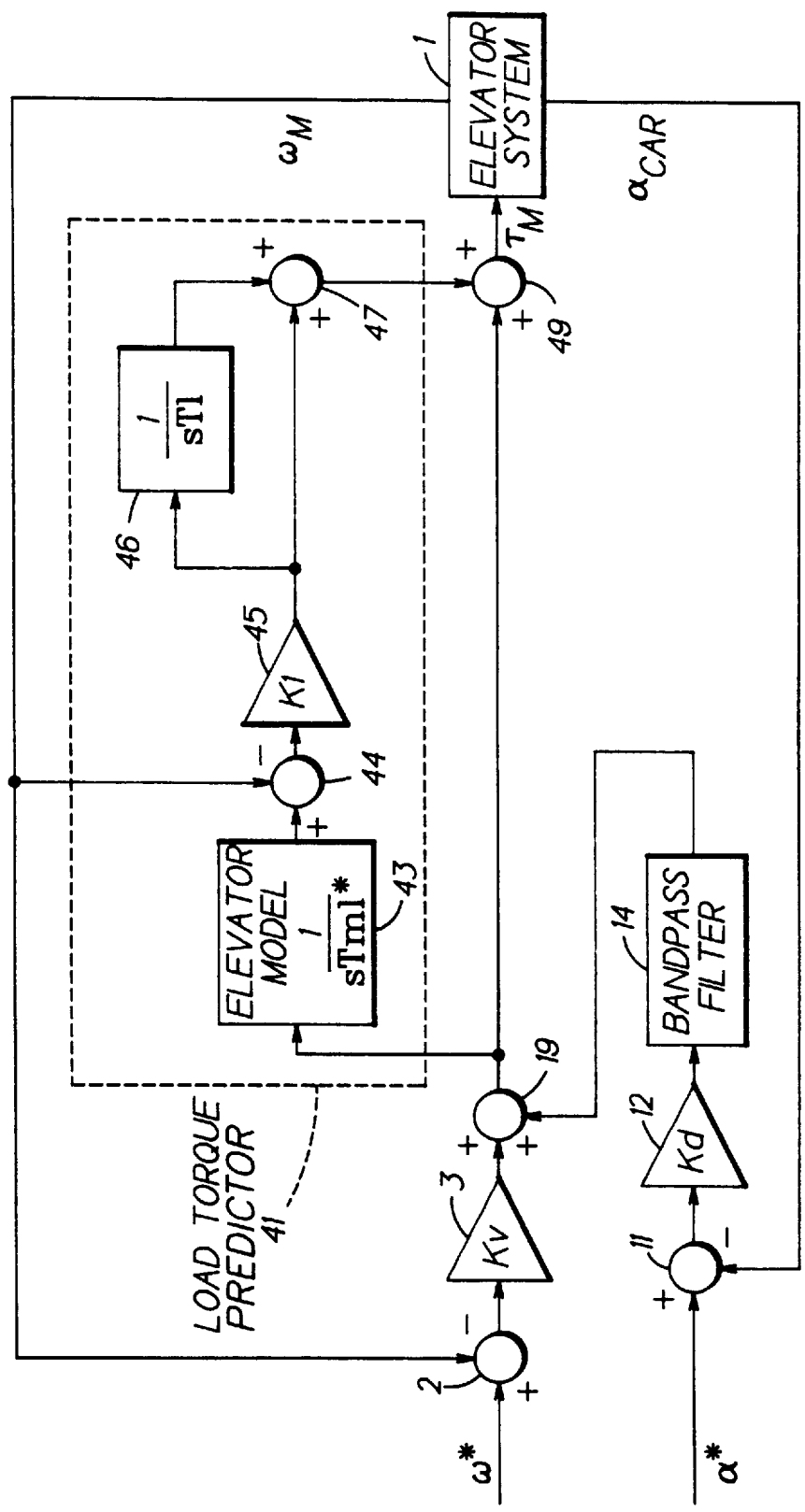
FIG. 8 is a block diagram of a speed control circuit similar to FIG. 7, using car acceleration feedback.

FIG. 8 illustrates another example of an elevator speed control circuit that uses a higher-dimension, more sophisticated load torque predictor. In this speed control circuit which uses a sophisticated predictor 41 illustrated in FIG. 7, the car speed feedback circuit 11–16 is replaced with the car acceleration feedback circuit 11–14 used in FIG. 2. Because a car acceleration feedback system is used in this speed control circuit, the vibration of the car can be suppressed more actively than in the example in FIG. 7.

In the aforementioned load torque predictors of FIGS. 3–8, the predictor gain must be large in order to improve the disturbance suppression effect. In general, the upper limit of the observer gain depends on the speed detection accuracy. Therefore, if a large predictor gain cannot be used because of insufficient speed detection accuracy, then a sufficient disturbance suppression effect cannot be realized.

Figure 9:
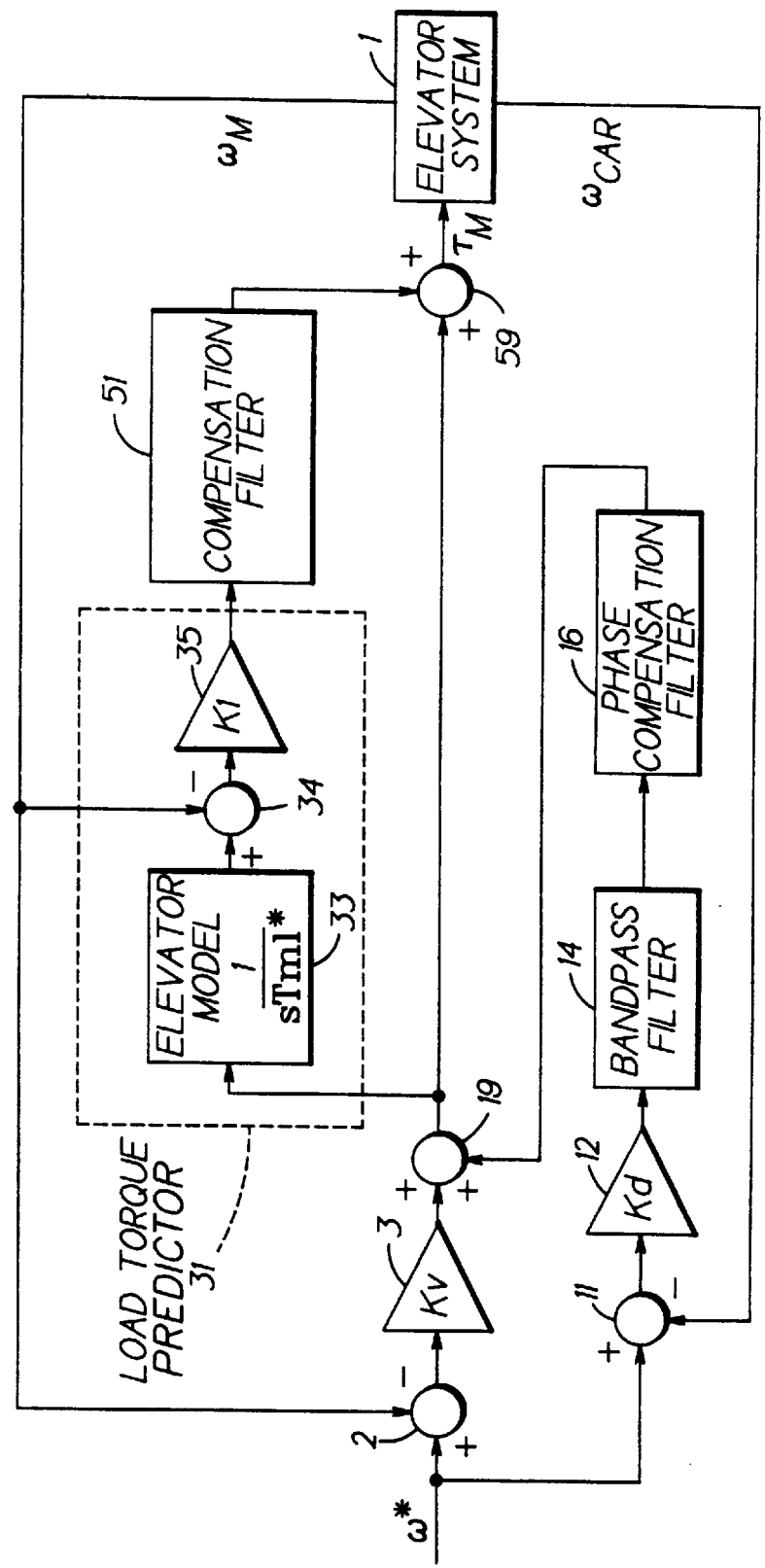
FIG. 9 is a block diagram of an elevator speed control circuit that compensates for load torque predictor gain.

FIG. 9 illustrates an elevator speed control circuit that compensates for the effects of motor speed detection inaccuracies on load torque predictor gain. In FIG. 9, 1 is an elevator system, 2–35 indicate a control circuit that is constructed in the same manner as FIG. 5, 51 is a compensating filter that is connected to the output of the load torque predictor 31, and 59 is an adder that adds the output signal of the compensating filter 51 to the output signal of the circuit 2–19 and outputs the torque instruction $\tau_M$ to the elevator system 1. The compensating filter 51 is a smoothing filter that suppresses large variations in the load torque estimate, it adds a lag to the feedback, and the lag time is a value that depends on the motor speed detection accuracy. The disturbance caused by speed detection errors is suppressed, so the predictor gain may be large.

Figure 10:
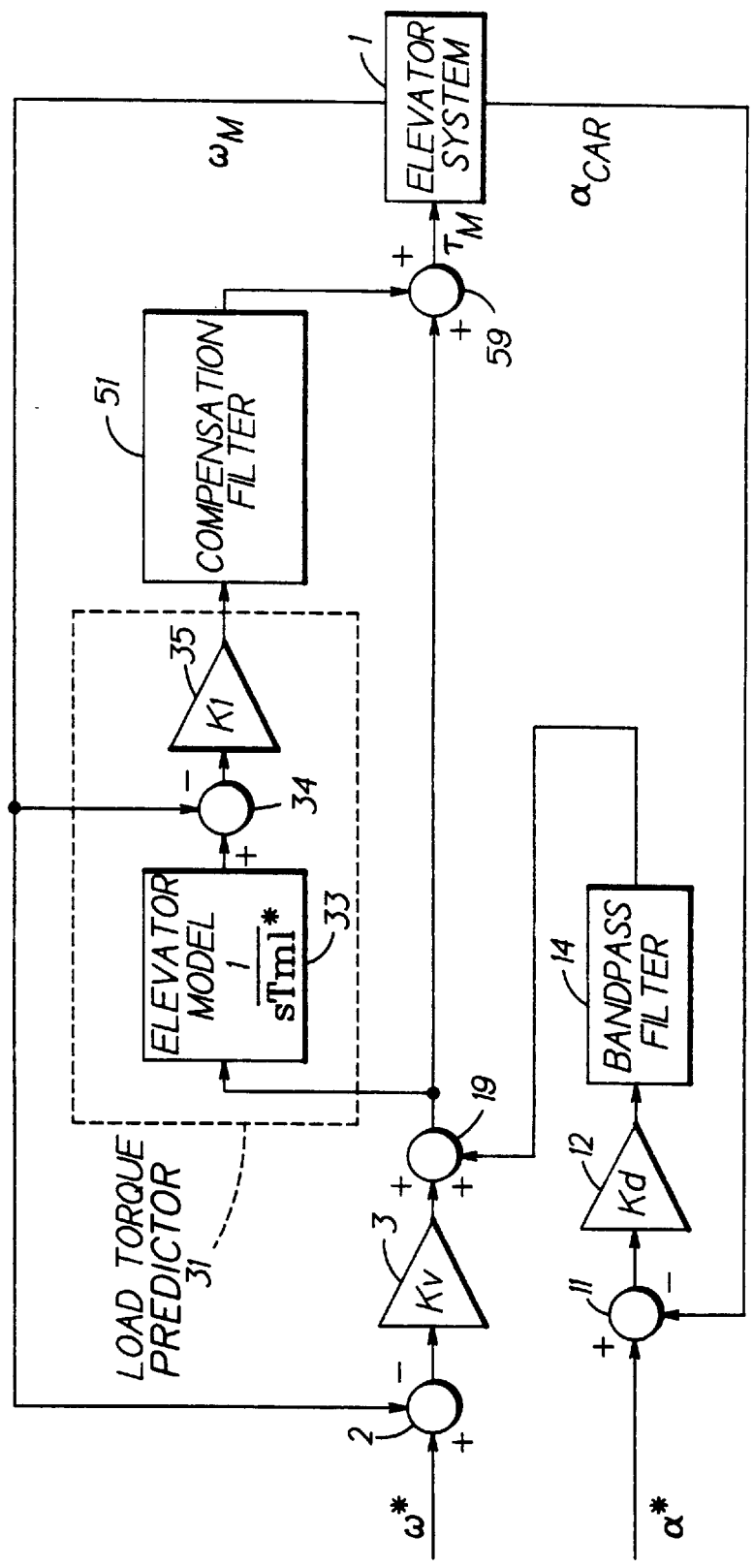
FIG. 10 is a block diagram of a speed control circuit similar to FIG. 10, using car acceleration feedback.

FIG. 10 illustrates another example of an elevator speed control circuit that compensates for the load torque predictor. This speed control circuit uses a load torque predictor 31 and a compensating filter 51 of FIG. 9, but the car speed feedback system 11–16 is replaced with a car acceleration feedback system 11–14 of FIG. 2. Because a car acceleration feedback system is used in this speed control circuit, the vibration of the car can be suppressed more actively than in the example in FIG. 9.

Figure 20:
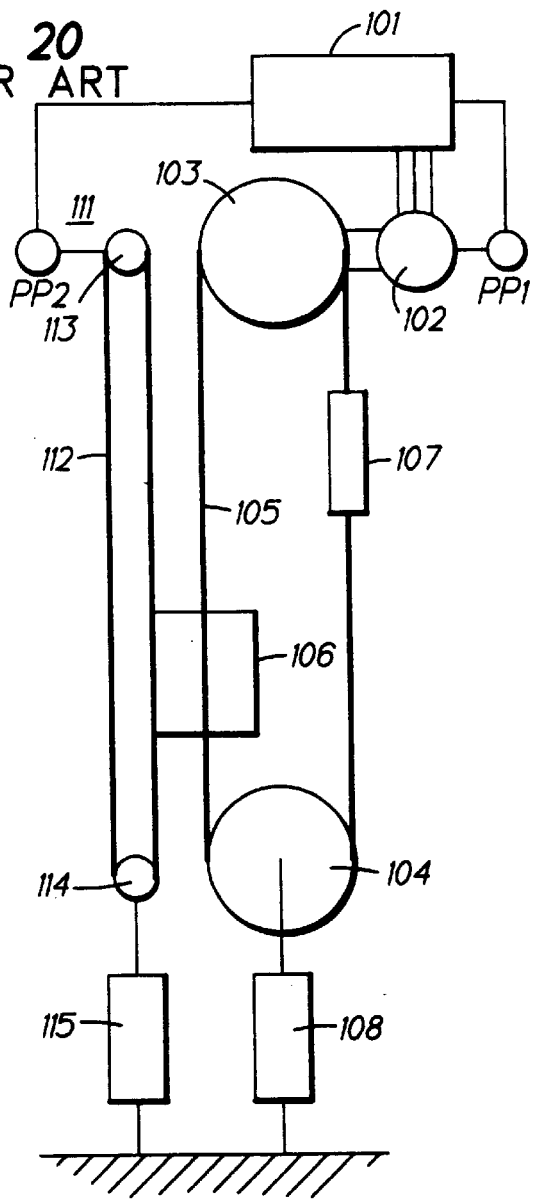
FIG. 20 is an explanatory structural diagram of a balanced type elevator known to the prior art.
Figure 21:
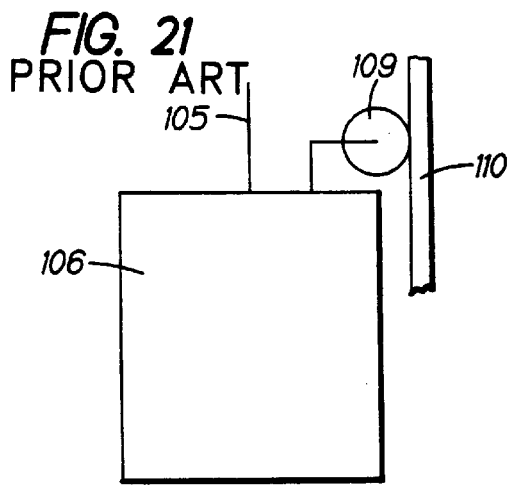
FIG. 21 is an illustration of a car-mounted speed detector.
Figure 22:
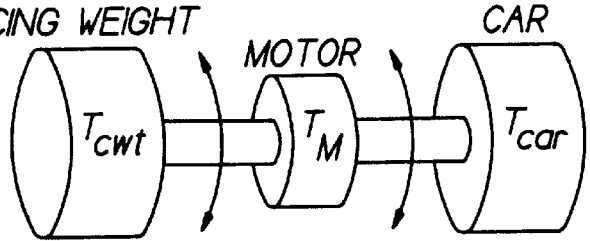
FIG. 22 is a diagram of a tri-inertia model of an elevator.

If a skyscraper elevator system 1 detects the actual car speed through a governor rope as illustrated in FIG. 20, the distance between the governor and the car may be long, so changes in actual car speed will not be sensed immediately due to elasticity of the governor rope. Thus, the effect of suppressing the car vibration may be reduced.

Figure 11:
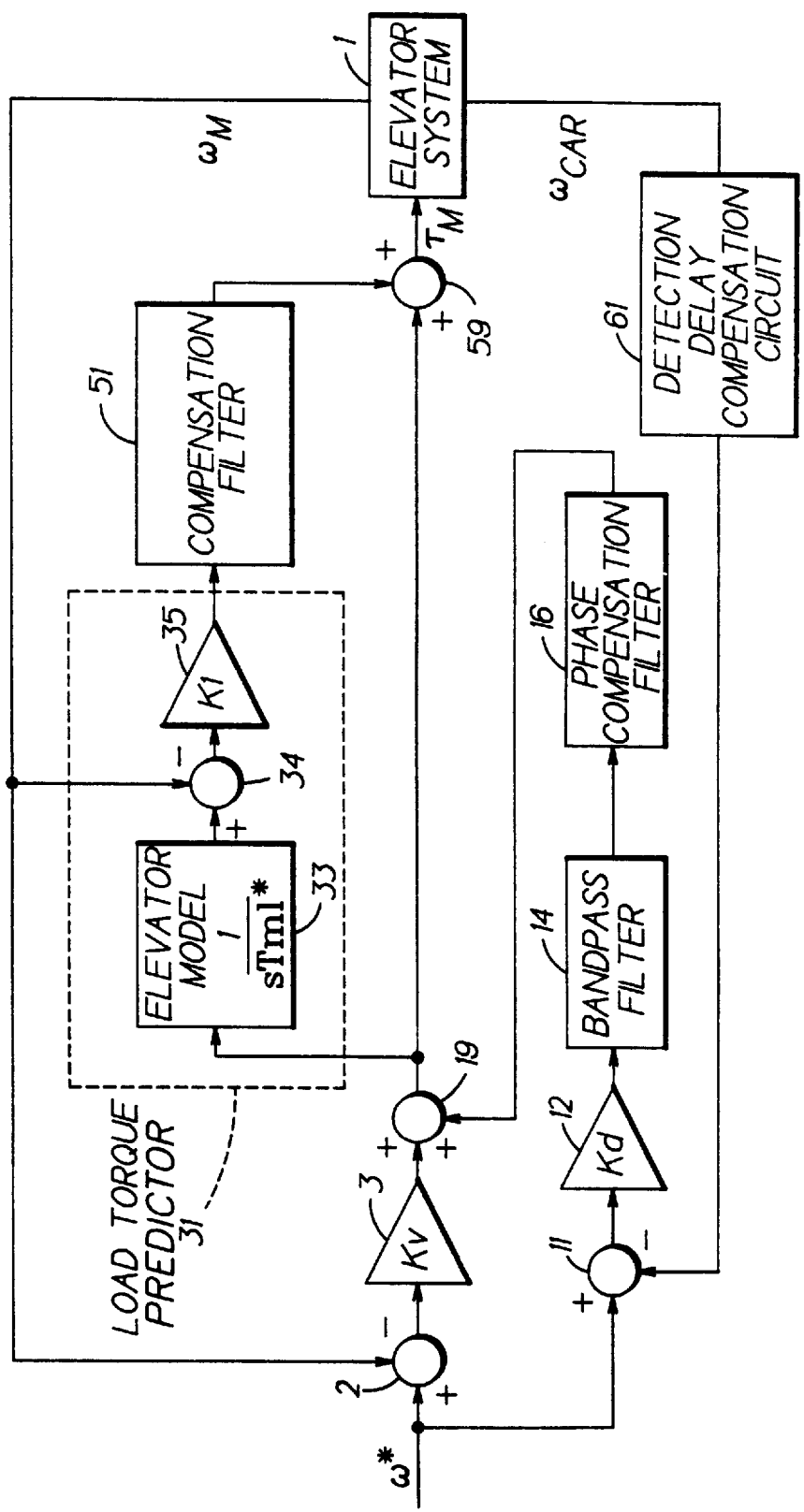
FIG. 11 is a block diagram of an elevator speed control circuit using car speed detection delay compensation.

FIG. 11 illustrates an elevator speed control circuit that uses a car speed detection delay compensating circuit. In FIG. 11, 1 is an elevator system, 2–59 indicate a control circuit that is constructed identically to the circuit illustrated in the aforementioned FIG. 9, and 61 is a speed detection delay compensating circuit, which may be a lead filter, that compensates for the delay of detecting the actual car speed value $\omega_{car}$, which is provided as feedback from the elevator system 1 to the adder 11. Thus, even if there is a delay in detecting the actual car speed detected value $\omega_{car}$, a control with adequate car vibration suppression may be realized.

Figure 12:
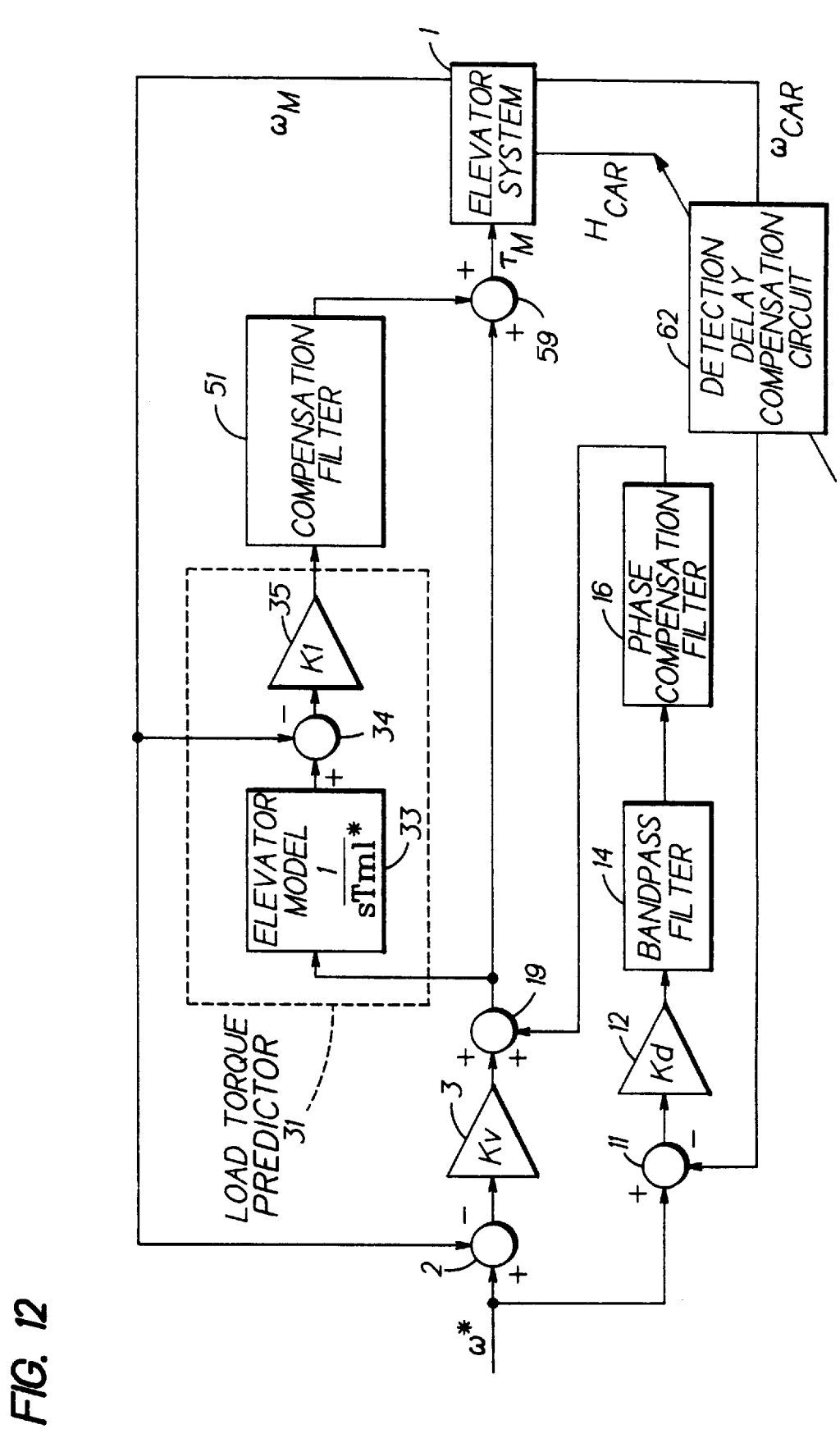
FIG. 12 is a block diagram of a speed control circuit using variable car speed detection delay compensation.

FIG. 12 illustrates another example of an elevator speed control circuit that uses a car speed detection delay compensating circuit 62 constructed in a manner that the amount of compensation for the detection delay will vary in response to the car height signal $H_{car}$ from the elevator system 1. Thus, the detection delay of the car speed due to the changes in the distance between the governor and the car is correspondingly compensated for in response to the height of the car. The other circuit elements 2–59 are identical to those in FIG. 1.

Figure 13:
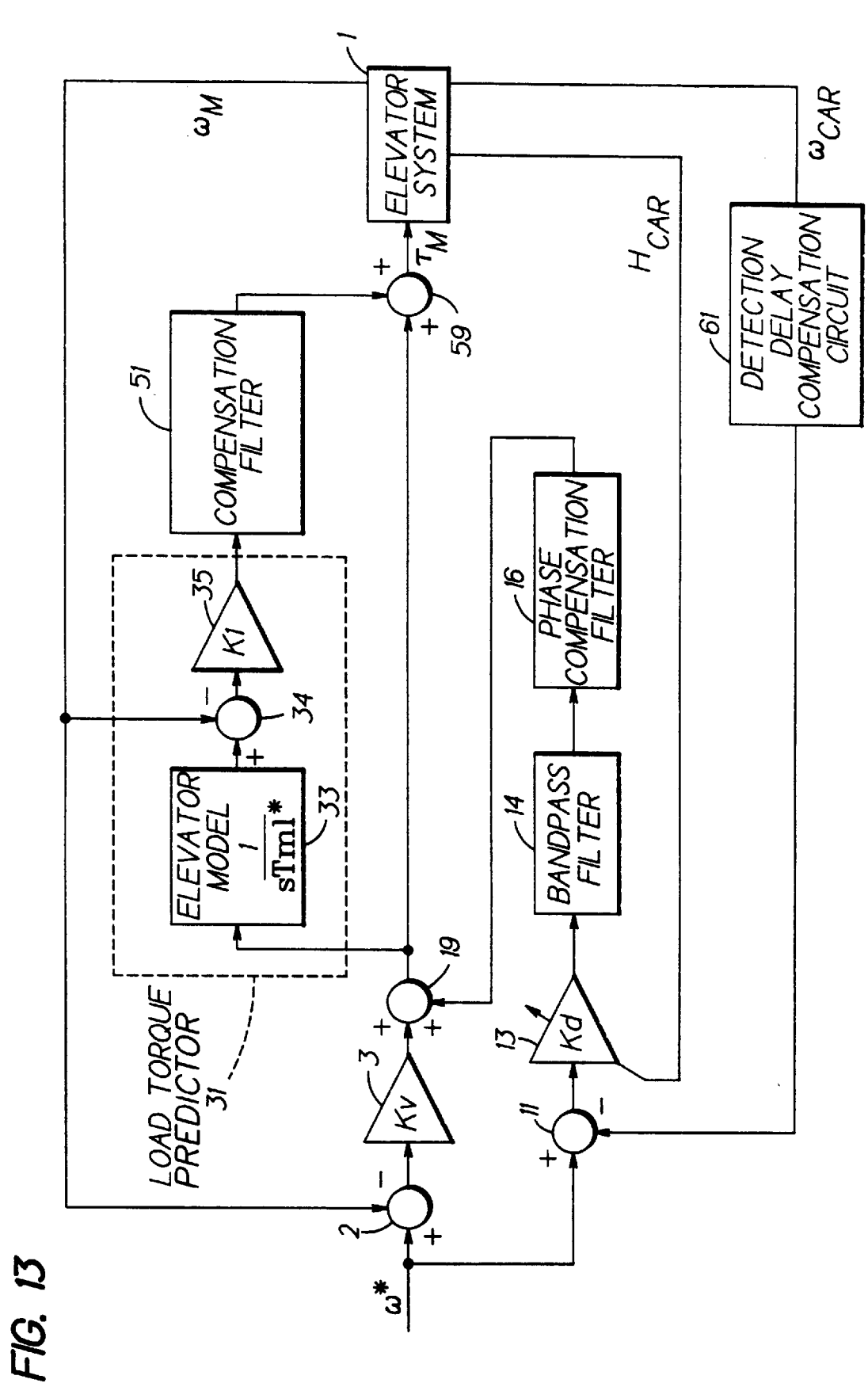
FIG. 13 is a block diagram of an elevator speed control circuit using variable car speed feedback gain.

FIG. 13 illustrates an elevator speed control circuit with variable car speed feedback gain. In FIG. 13, 13 is a speed amp of variable gain that replaces the gain fixed speed amp 12 of FIG. 11. The gain is controlled by the car position signal $H_{car}$ from the elevator system 1. The other circuit elements are identical to those in FIG. 11. As the characteristics of the elevator vary depending on the position of the car, by varying the gain of the speed amp 13 as a function of the position of the car increases the vibration suppression effect.

Figure 14:
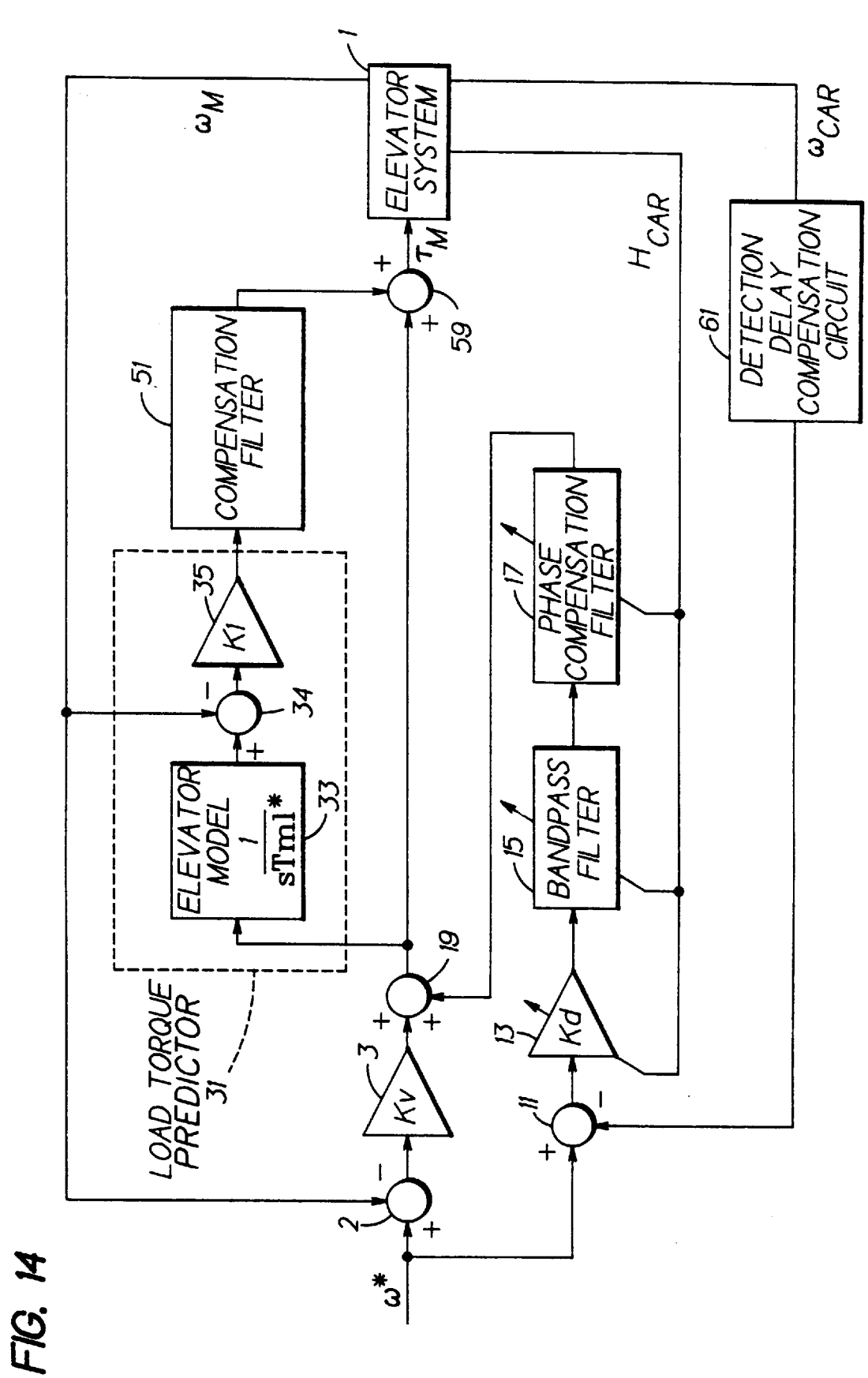
FIG. 14 is a block diagram of a speed control circuit, using variable car speed feedback gain, variable bandpass filter, and variable phase compensation.
Figure 15:
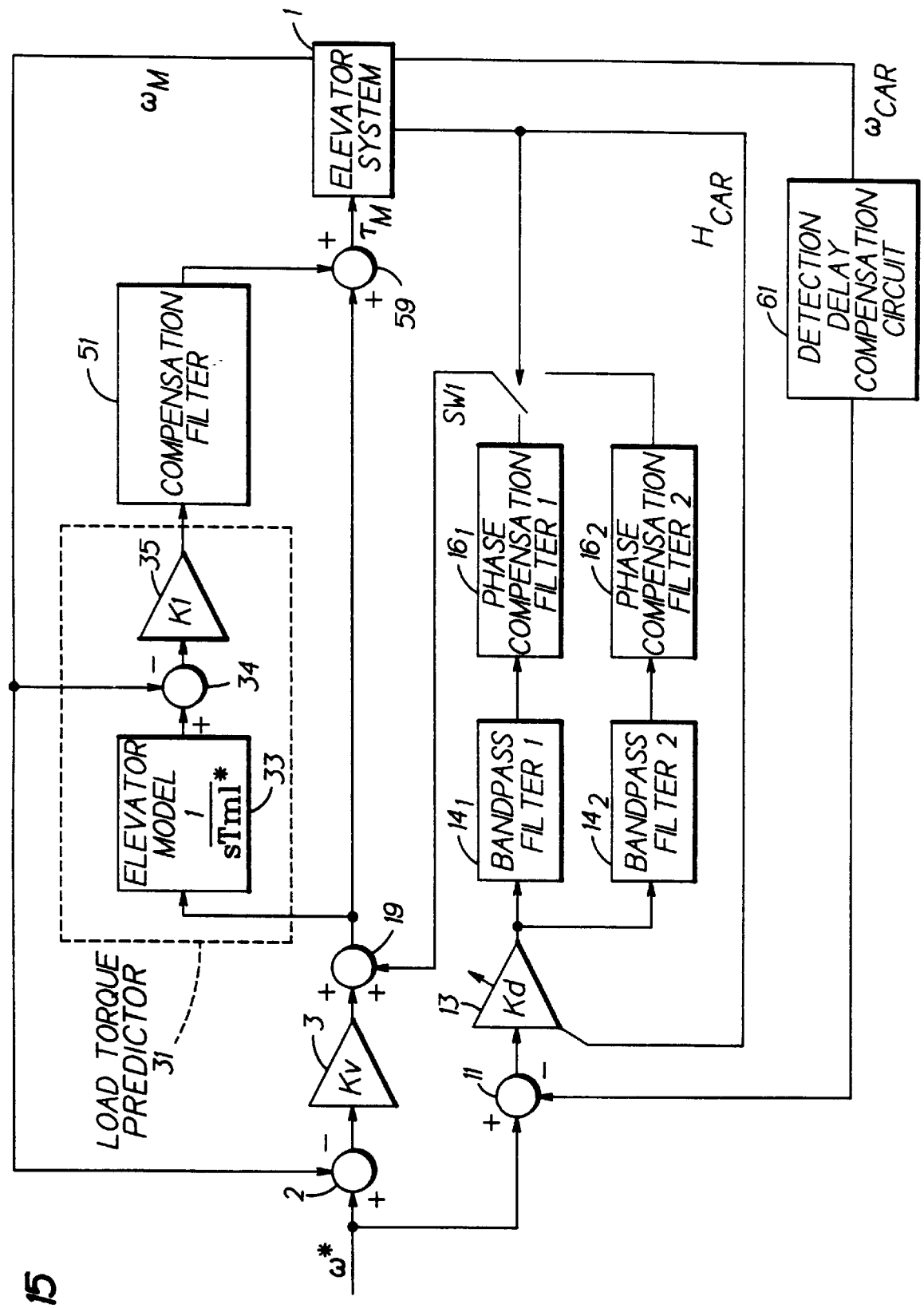
FIG. 15 is a block diagram of a speed control circuit using variable car speed feedback gain, and selectable filters.
Figure 17:
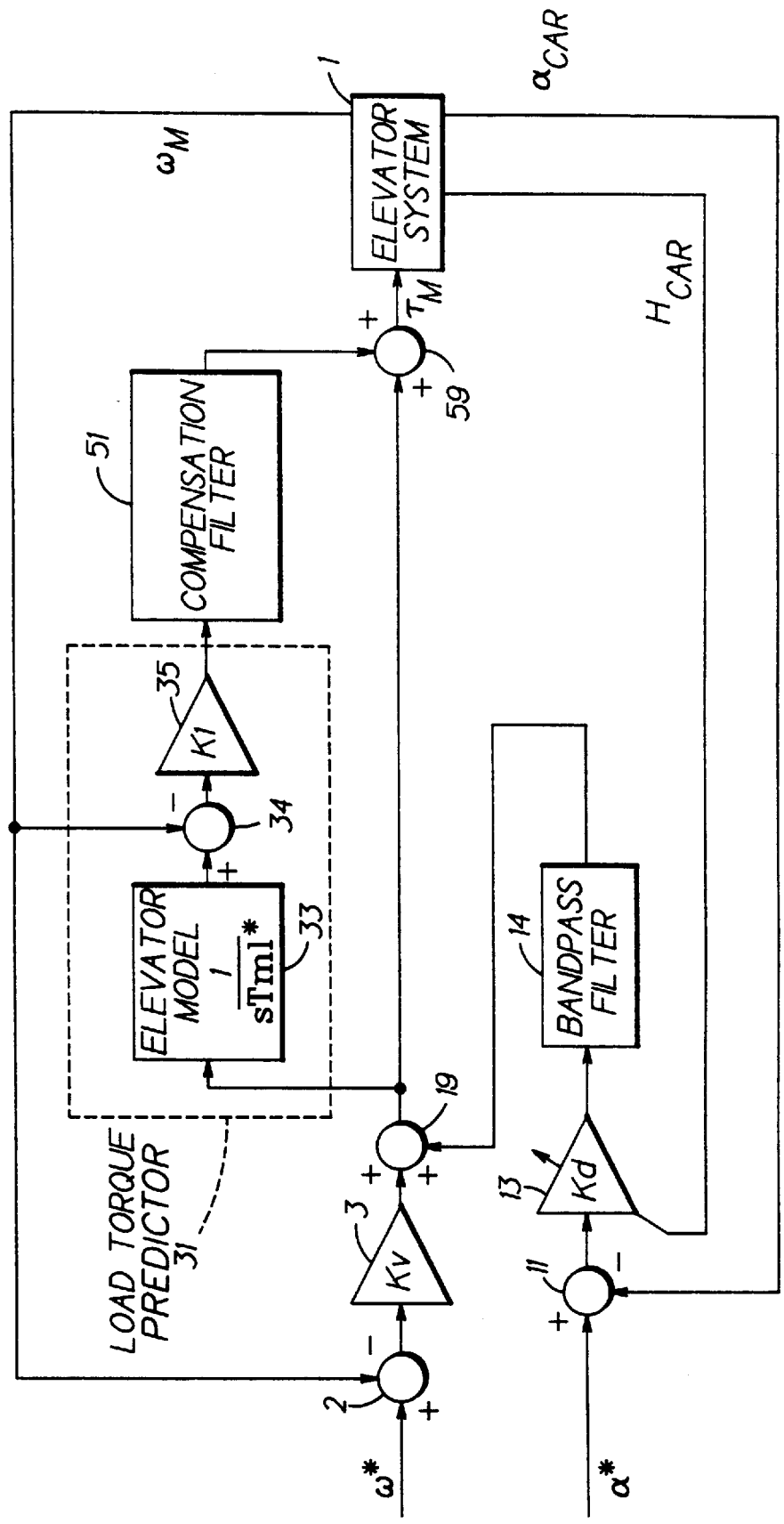
FIG. 17 is a block diagram of an elevator speed control circuit having variable car acceleration feedback gain.

As described earlier, the characteristics of the elevator vary depending on the height of the car, making the bandwidth and the phase of the bandpass filter and the phase compensating filter variable will increase the vibration suppression effect. FIG. 14 illustrates an elevator speed control circuit with variable car speed feedback gain. In FIG. 14, 15 and 17 are respectively a variable bandpass filter and a variable phase compensating filter, which respectively replace the bandpass filter 14 and the phase compensating filter 16 in FIG. 13. They are constructed in a manner that they will respectively have the passband and the phase compensation controlled by the car height signal $H_{car}$ from the elevator system 1. The other circuit elements are identical to those in FIG. 13.

The characteristics of the elevator are significantly different from the cases when the car is at an upper part or at a lower part of the hoistway. FIG. 15 illustrates an elevator speed control circuit with variable car speed feedback gain. In FIG. 15, $14_1$ and $14_2$ are bandpass filters to which the output signal of the variable gain amp 13 is input, $16_1$ and $16_2$ are phase compensating filters to which the output signals of the filters $14_1$ and $14_2$ are input, and SW1 is a changeover switch that switches the output signals of the filters $16_1$ and $16_2$ between the cases when the car is located higher or lower than a predetermined position in response to the car height signal $H_{car}$ from the elevator system 1, and provides the output to the adder 19. By providing the bandpass filters $14_1$ and $14_2$ and the phase compensating filters $16_1$ and $16_2$ with different characteristics, and selecting one set in response to the car height signal, the vibration suppression effect will improve compared to the effects derived from the circuit in FIG. 13. The other circuit elements are identical to those in FIG. 13.

Figure 16:
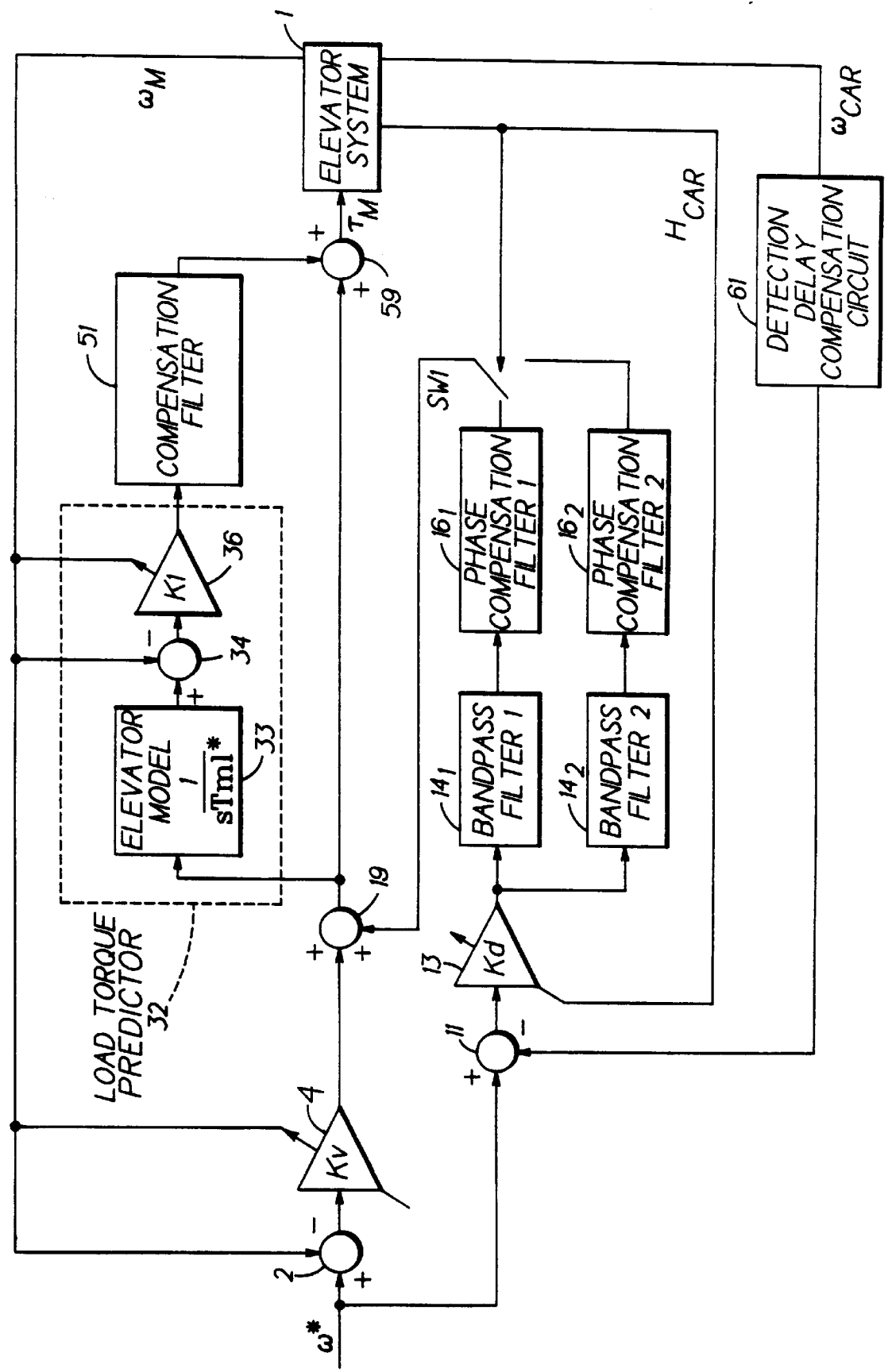
FIG. 16 is a block diagram of a speed control circuit similar to FIG. 15 with variable speed amp gain and variable load torque predictor gain.

The load torque predictor gain should be high during high speed operation, but not during low speed operation. FIG. 16 illustrates a vibration suppression circuit with variable load torque predictor gain. In FIG. 16, 4 is a motion or amp with variable gain that is used instead of the motion or speed amp 3 in FIG. 15, and 32 is a load torque predictor that is the same as the load torque predictor 31 in FIG. 15 except for the fact that the amp 35 is replaced with a variable gain amp 36. The gain of the amp 4 varies in inverse proportion to the actual motor speed value $\omega_M$, and the gain of the amp 36 varies in direct proportion to the actual motor speed value $\omega_M$. The predictor gain must be made small. However, because the gain of the amp 36 varies in proportion to the motor speed detected value $\omega_M$ in this circuit, the predictor gain will be small during low speed operation which is acceptable because the speed deviations will also be small during low speed operation. In this embodiment, because the gain of the speed amp 4 varies in inverse proportion to the actual motor speed value $\omega_M$, the speed responsiveness is higher during low speed operation. The other circuit elements are constructed identically to those in FIG. 15.

Figure 18:
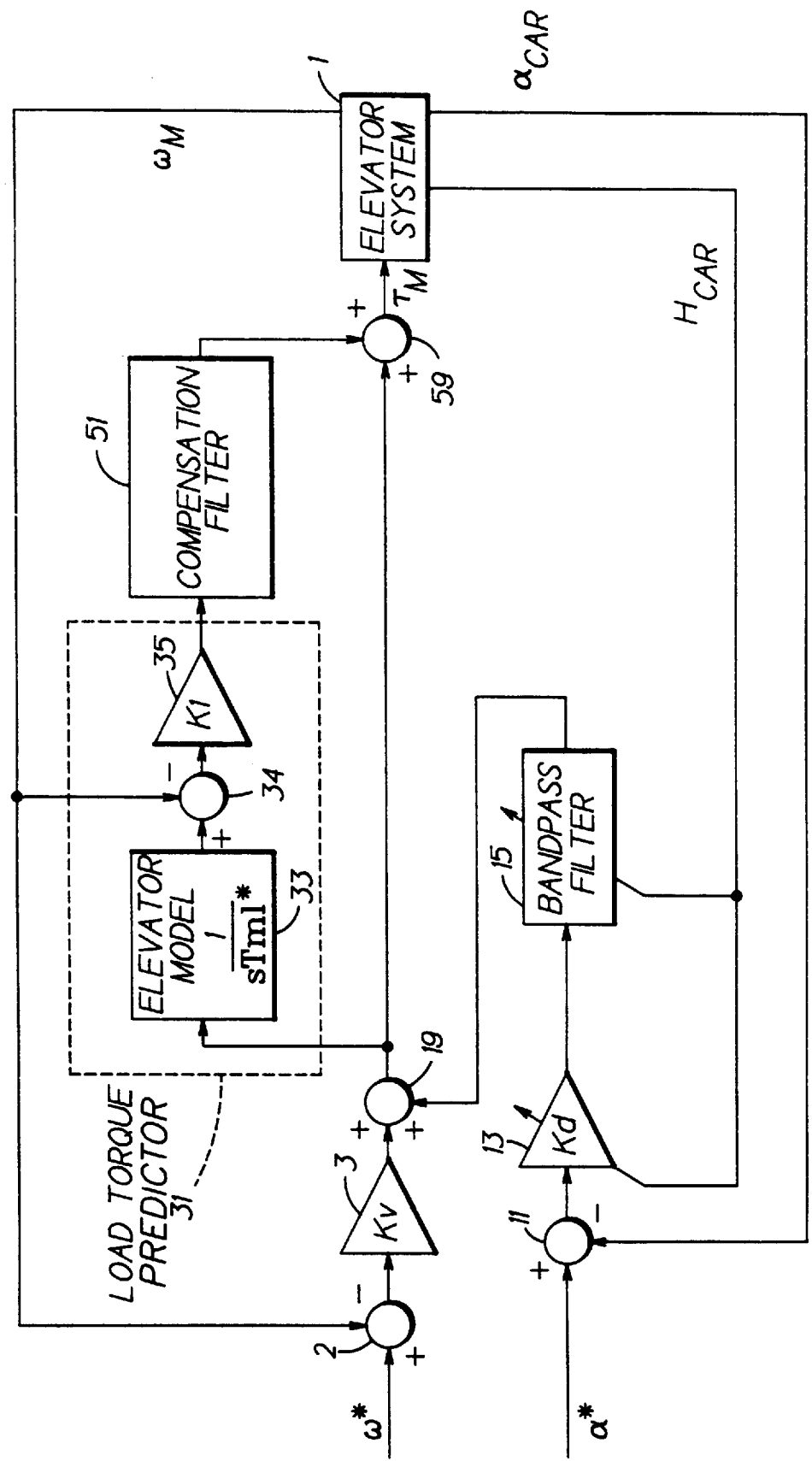
FIG. 18 is a block diagram of a speed control circuit similar to FIG. 17 having a variable bandpass filter.

Since the characteristics of the elevator vary depending on the position of the car, by adopting an acceleration amp with variable gain that varies depending on the car position, the vibration suppression effect will increase. FIG. 17 illustrates an elevator speed control circuit with variable car acceleration feedback gain. In FIG. 17, 13 is a variable gain acceleration amp that replaces the acceleration amp 12 with fixed gain of FIG. 10. The gain of this amp is controlled by the car height signal $H_{car}$ from the elevator system 1. The other circuit parts are constructed identically to those in FIG. 10. FIG. 18 illustrates another example of an elevator speed control circuit with variable car acceleration feedback gain. In FIG. 18, 13 and 15 are an acceleration amp with variable gain and a variable bandpass filter that replace the acceleration amp with fixed gain 13 and the fixed bandpass filter 14 in FIG. 10. The gain of the amp and the passband of the filter are controlled by the car height signal $H_{car}$ from the elevator system 1. Otherwise, the circuit is constructed identically to that in FIG. 10.

Figure 19:
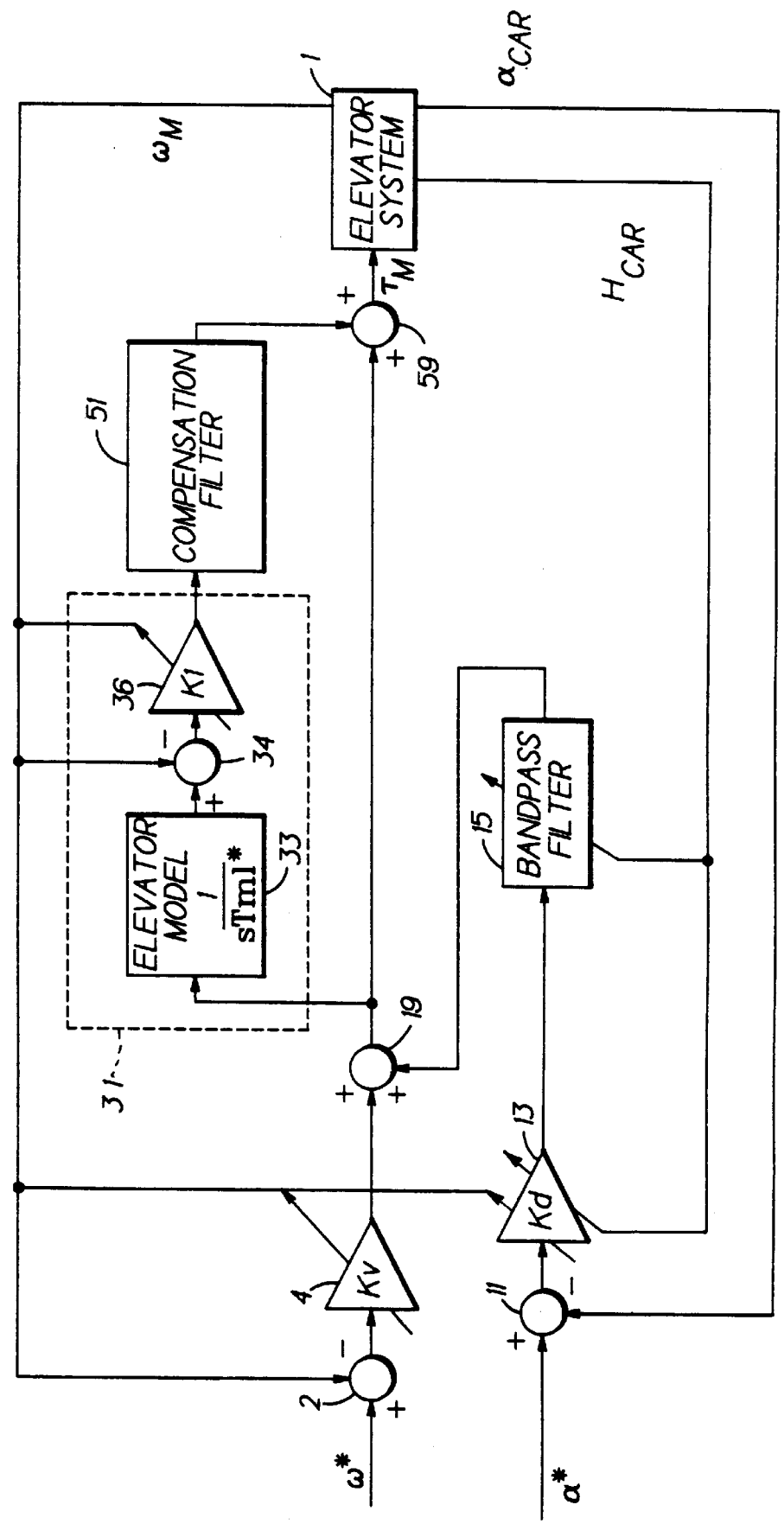
FIG. 19 is a block diagram of an elevator speed control circuit similar to FIG. 18 wherein the speed amp gain and the load torque predictor gain are variable.

FIG. 19 illustrates an elevator speed control circuit wherein the gain of the speed amp, the predictor gain and the vibration suppression feedback gain are made variable. In FIG. 19, 4 is a variable gain speed amp, 36 is a variable gain amp of a load torque predictor wherein the gain varies depending on the actual motor speed value $\omega_M$, 13 is a variable gain acceleration feedback amp wherein the gain varies depending on the actual motor speed value $\omega_M$ and the car height $H_{car}$, and 15 is a variable bandpass filter wherein the passband varies depending on the car height $H_{car}$. Otherwise, the construction is identical to that in FIG. 18. With this speed control circuit, if the actual motor speed value $\omega_M$ becomes rough during very low speed operation, no chattering will occur.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. An elevator speed control for an elevator having a car moveable in a hoistway; a counterweight connected to the car by a rope passing over a sheave driven by a motor, means for sensing the speed of said motor and providing motor speed signals indicative thereof, means for sensing the motion of said car and providing car motion signals indicative thereof, and a controller for providing motion command signals, comprising:

a proportional and integral motion amplifier responsive to the deviation between the motion indicated by said motion command signals and the actual motor motion indicated by said motor motion signals to provide a torque indicating signal indicative of a torque required of said motor;

characterized by the improvement comprising:

deviation means responsive to said motion command signals and to said car motion signals for providing a deviation signal responsive to the difference therebetween, said difference including car vibration components;

a bandpass filter responsive to said deviation signal and having a passband related to the frequencies of said car vibration components;

feedback means responsive to the output of said bandpass filter for adding signals related to said car vibration components with said torque indicating signal to provide a torque command signal to said motor.

2. A speed control according to claim 1 wherein:

said motion command signals include speed command signals;

said car motion signals are indicative of the speed of said car;

said deviation signal is indicative of the difference between a speed command signal and the actual speed of said car; and said feedback means includes a phase adjusting filter, responsive to the output of said bandpass filter, and an adder responsive to the output of said phase adjusting filter.

3. A speed control according to claim 2 wherein:

said means for sensing the motion of said car comprises an elevator governor having a rope, and a speed sensor including a pulse generator rotationally coupled to said governor rope for providing an actual car speed signal; and further comprising:

a speed detection delay compensation circuit for compensating for delay in sensing actual car speed caused by said governor rope.

4. A speed control according to claim 3, additionally comprising:

means for sensing the position of said car in said hoistway and providing a car height signal indicative thereof; and wherein:

said detection delay compensation circuit provides delay compensation which varies in response to said car height signal.

5. A speed control according to claim 3 further comprising:

means for sensing the position of said car in said hoistway and providing a car height signal indicative thereof; and wherein:

said deviation means comprises an amplifier having gain which varies in response to said height signal.

6. A speed control according to claim 5 wherein:

the passband of said bandpass filter varies in response to said height signal; and said phase compensation filter provides phase compensation which varies in response to said height signal, whereby vibration suppression feedback effects are a function of the height of said car.

7. A speed control according to claim 1 wherein said motion command signals include acceleration command signals;

said car motion signals are indicative of the acceleration of said car; and said deviation signal is indicative of the difference between said acceleration command signals and the actual acceleration of said car.

8. A speed control according to claim 7 further comprising:

means for sensing the position of said car in said hoistway and for providing a car height signal indicative thereof; and wherein:

the gain of said deviation means varies in response to said car height signal.

9. A speed control according to claim 8 wherein:

the passband of said bandpass filter varies in response to said car height signal.

10. A speed control according to claim 1 further comprising:

a load torque predictor responsive to said torque indicating signal and to said motor motion signals for providing a load torque signal indicative of estimated load torque of said motor; and means for summing said load torque signal and said torque indicating signal to provide a torque command signal to said motor.

11. A speed control according to claim 10 wherein said load torque predictor comprises:

an elevator model circuit providing a model signal;

means for providing said load torque signal in response to the difference between said model signal and said motor motion signals; and means responsive to the difference between said torque command signal and said load torque signal for providing an input to said elevator model circuit.

12. A speed control according to claim 10 wherein said load torque predictor comprises:

an elevator model circuit responsive to said torque indicating signal to provide a model signal; and difference means responsive to the difference between said model signal and said motor motion signals to provide said load torque signal.

13. A speed control according to claim 10 wherein said load torque predictor comprises a proportional and integral amplifier.

14. A speed control according to claim 10 wherein said difference means comprises a proportional amplifier.

15. A speed control according to claim 10 wherein said difference means comprises a proportional amplifier the output of which is passed through a smoothing filter to suppress large variations in said load torque signal.

16. A speed control according to claim 10 wherein the gain of said deviation means, the gain of said motion amplifier, and the gain of said load torque predictor each vary in response to said motor motion signal.

* * * * *